(12) United States Patent
Kanaya et al.

(10) Patent No.: US 8,431,858 B2
(45) Date of Patent: Apr. 30, 2013

(54) SEAM WELDING METHOD AND SEAM WELDING APPARATUS

(75) Inventors: Kohei Kanaya, Utsunomiya (JP); Haruo Machida, Saitama-ken (JP); Naoji Yamaoka, Sayama (JP); Tsutomu Asaina, Utsunomiya (JP)

(73) Assignee: Honda Motor Co., Ltd., Tokyo (JP)

( * ) Notice: Subject to any disclaimer, the term of this patent is extended or adjusted under 35 U.S.C. 154(b) by 721 days.

(21) Appl. No.: 12/630,492

(22) Filed: Dec. 3, 2009

(65) Prior Publication Data
US 2010/0170879 A1    Jul. 8, 2010

(30) Foreign Application Priority Data
Jan. 7, 2009   (JP) .................... 2009-001488

(51) Int. Cl.
*B23K 11/02* (2006.01)
*B23K 11/06* (2006.01)
*B23K 11/08* (2006.01)
*B23K 11/24* (2006.01)

(52) U.S. Cl.
USPC .......... 219/104; 219/83; 219/110; 219/117.1; 219/82

(58) Field of Classification Search ............... 219/81–83, 219/108–110, 117.1, 101–104
See application file for complete search history.

(56) References Cited

FOREIGN PATENT DOCUMENTS
JP    03-068791 B2    10/1991

*Primary Examiner* — Kevin P Kerns
*Assistant Examiner* — Steven Ha
(74) *Attorney, Agent, or Firm* — Arent Fox LLP

(57) ABSTRACT

The seam welding apparatus welds a workpiece held by a robot while delivering the workpiece between a pair of electrode rolls. The seam welding apparatus includes a load cell mounted on the robot, for detecting a load imposed along a Y direction which is perpendicular to a pressing direction Z along which the electrode rolls press the workpiece at a weld point and a delivering direction X along which the robot delivers the workpiece at the weld point, a robot controller and an arithmetic unit, a turning mechanism for turning the electrode rolls about the pressing direction Z, and a control device for controlling the turning mechanism to operate depending on the magnitude of the load in the Y direction detected by the load cell.

6 Claims, 15 Drawing Sheets

FIG. 10

| Y-DIRECTION LOAD Fy [kN] BITING (DERAILING) | CORRECTIVE ANGLE $\alpha$ [°] BITING (DERAILING) |
|---|---|
| 0 | 0 |
| 0.2 (−0.2) | −0.5 (0.5) |
| 0.4 (−0.4) | −1.0 (1.0) |
| 0.6 (−0.6) | −1.5 (1.5) |
| 0.8 (−0.8) | −2.0 (2.0) |
| 1.0 (−1.0) | −2.5 (2.5) |

FIG. 11

| LOAD DETECTING POSITION | WORKPIECE POSITION CHARACTERISTICS | CORRECTIVE COEFFICIENT |
|---|---|---|
| P1~P2, P14~P1 | HIGH | 1.0 |
| P2~P4, P12~P14 | MEDIUM | 1.5 |
| P4~P6, P10~P12 | LOW | 2.0 |
| P6~P7, P9~P10 | MEDIUM | 1.5 |
| P7~P8, P8~P9 | HIGH | 1.0 |

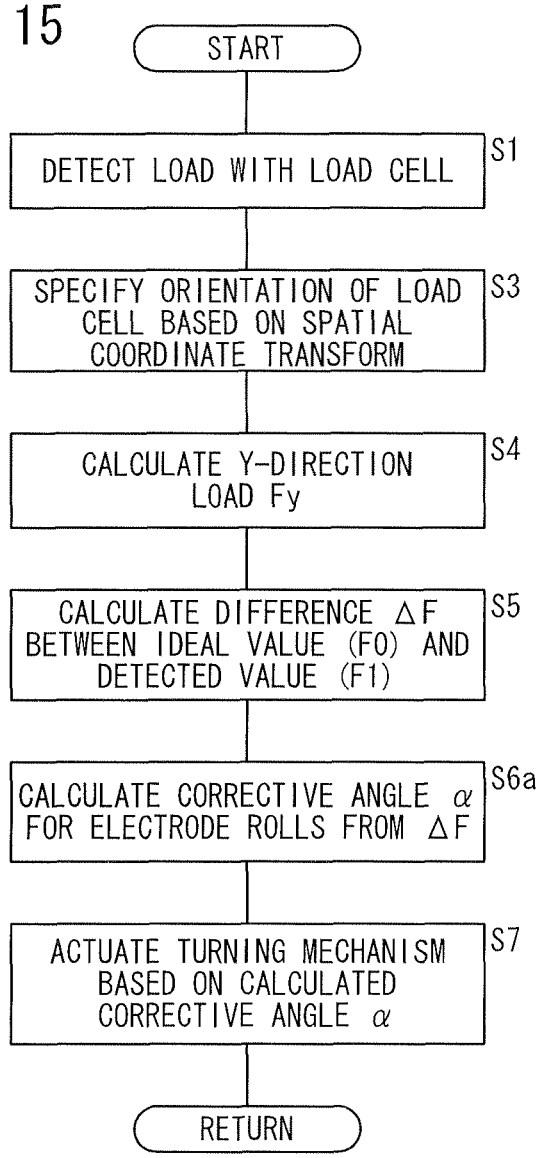

SEAM WELDING METHOD AND SEAM WELDING APPARATUS

CROSS-REFERENCE TO RELATED APPLICATION

This application is based upon and claims the benefit of priority from Patent Application No. 2009-001488 filed on Jan. 7, 2009, in the Japan Patent Office, of which the contents are incorporated herein by reference.

BACKGROUND OF THE INVENTION

1. Field of the Invention

The present invention relates to a seam welding method and a seam welding apparatus for welding a workpiece while the workpiece is being delivered between a pair of electrode rolls.

2. Description of the Related Art

Fuel tanks for use on motor vehicles or the like, for example, are manufactured by superposing outer circumferential portions of two members that have been pressed to shape and welding the superposed outer circumferential portions. The welded outer circumferential portions have a two-dimensional or three-dimensional curved shape.

For welding workpieces of the type described above, the present applicant has proposed a method of controlling a seam welding apparatus for holding a workpiece with a workpiece holding jig on the wrist on the effector end of a robot and welding the workpiece while the workpiece is being delivered between a pair of electrode rolls (see Japanese Patent Publication No. 03-068791). According to the proposed control method, the difference between the normal torque acting on the wrist when the actual distance that the workpiece is delivered by the electrode rolls and the distance that the workpiece is fed by the robot are in agreement with each other, and the torque acting on the wrist when the workpiece is actually welded is detected, and the rotational speed of the electrode rolls and the direction of travel of the workpiece are changed depending on the detected difference. In this manner, even if the actual welding track deviates from a desired normal track, the actual welding track can automatically be brought back to the normal track, allowing the workpiece to be seam-welded accurately.

The control method of the above related art requires acquiring a more accurate normal torque (master data) for a more accurate welding operation. For example, a plurality of welding processes are performed on a workpiece on a trial basis while at the same time torques applied respectively during the welding processes are recorded, and the torque applied when the workpiece was welded at a high quality level is regarded as a normal torque.

The above process of acquiring a normal torque is disadvantageous in that since the workpiece is welded on a trial basis without the actual welding track correction referred to above, it may be difficult to achieve a high quality level which is good enough to obtain a normal torque. In addition, the process is tedious and time-consuming because of the need for a plurality of good-quality samples to be produced for increased normal torque accuracy. If the shape or rigidity of the workpiece or the welding rate is changed, then the normal torque needs to be acquired again.

When a highly accurate normal torque has not been obtained, it is difficult to quickly and accurately determine whether the actual welding track deviates from a desired normal track or not, with the result that the workpiece cannot be welded at a high quality level. Furthermore, since different welding regions have different rigidities and different distances from the workpiece holding jig, the actual deviation of the actual welding track from a desired normal track may be different depending on the different welding regions even though the detected torque value remains the same.

SUMMARY OF THE INVENTION

It is an object of the present invention to provide a seam welding method and a seam welding apparatus which are capable of welding workpieces of various shapes at a high quality level while correcting a welding track more simply and accurately.

According to an aspect of the present invention, there is provided a seam welding method of seam-welding a workpiece held by a robot while delivering the workpiece between a pair of electrode rolls, comprising the steps of detecting a load imposed along a direction which is perpendicular to a pressing direction along which the electrode rolls press the workpiece at a weld point and a delivering direction along which the robot delivers the workpiece at the weld point, and turning the electrode rolls about the pressing direction by an angle depending on the magnitude of the detected load.

According to another aspect of the present invention, there is provided a seam welding apparatus for seam-welding a workpiece held by a robot while delivering the workpiece between a pair of electrode rolls, comprising a load detector mounted on the robot, for detecting a load imposed along a direction which is perpendicular to a pressing direction along which the electrode rolls press the workpiece at a weld point and a delivering direction along which the robot delivers the workpiece at the weld point, a turning mechanism for turning the electrode rolls about the pressing direction, and a controller for controlling the turning mechanism to operate depending on the magnitude of the load detected by the load detector.

With the above method and apparatus, a load is detected which is imposed along the direction (Y direction) which is perpendicular to the pressing direction (Z direction) along which the electrode rolls press the workpiece at the weld point and the delivering direction (X direction) along which the robot delivers the workpiece at the weld point, and the electrode rolls are turned by an angle depending on the magnitude of the detected load. When the direction along which the electrode rolls deliver the workpiece and the direction along which the robot delivers the workpiece are aligned with each other at the weld point, i.e., when the workpiece is properly welded without the electrode rolls derailing off or biting into the workpiece, the detected load is nil (zero). Therefore, calculations for acquiring a master load and comparing the master load with the detected load are not required. Whether a welding track deviates from a target welding track or not can be determined easily and quickly only based on the detected load, and deviations of the welding track from the target welding track can be corrected appropriately.

In this aspect, the step of turning the electrode rolls may comprise the steps of acquiring, from a table storing a correspondence relationship between magnitudes of the load and corrective angles for the electrode rolls, one of the corrective angles which corresponds to the magnitude of the detected load, and turning the electrode rolls by the acquired corrective angle. With this arrangement, deviations of the welding track from the target welding track can be corrected more quickly.

The step of acquiring one of the corrective angles may comprise the step of correcting the corrective angle using one of corrective coefficients established for respective positions in welding regions of the workpiece. With this arrangement, since the corrective angle for the electrode rolls can be determined in view of characteristics such as rigidity at the respective positions in the welding regions of the workpiece, a corrective quantity for the welding track can be adjusted appropriately, so that the workpiece can be welded at a high quality level.

The seam welding apparatus may preferably include a first table storing a correspondence relationship between magnitudes of the load and corrective angles for the electrode rolls, and a second table storing corrective coefficients established based on characteristics at respective positions in welding regions of the workpiece.

The above and other objects, features, and advantages of the present invention will become more apparent from the following description when taken in conjunction with the accompanying drawings in which preferred embodiments of the present invention are shown by way of illustrative example.

BRIEF DESCRIPTION OF THE DRAWINGS

FIG. 10 is a table showing an example of a relationship between Y-direction loads and corresponding corrective angles for the turning angle of the electrode rolls;

FIG. 11 is a table showing an example of a relationship between load detecting positions of a load cell, workpiece position characteristics at respective welding positions, and corresponding corrective coefficients;

FIG. 15 is a flowchart of a control sequence of a seam welding method according to a modification of the embodiment shown in FIG. 9.

DESCRIPTION OF THE PREFERRED EMBODIMENTS

Seam welding methods according to preferred embodiments of the present invention in reference to seam welding apparatus for carrying out the seam welding methods will be described in detail below with reference to the accompanying drawings.

Figure 1:
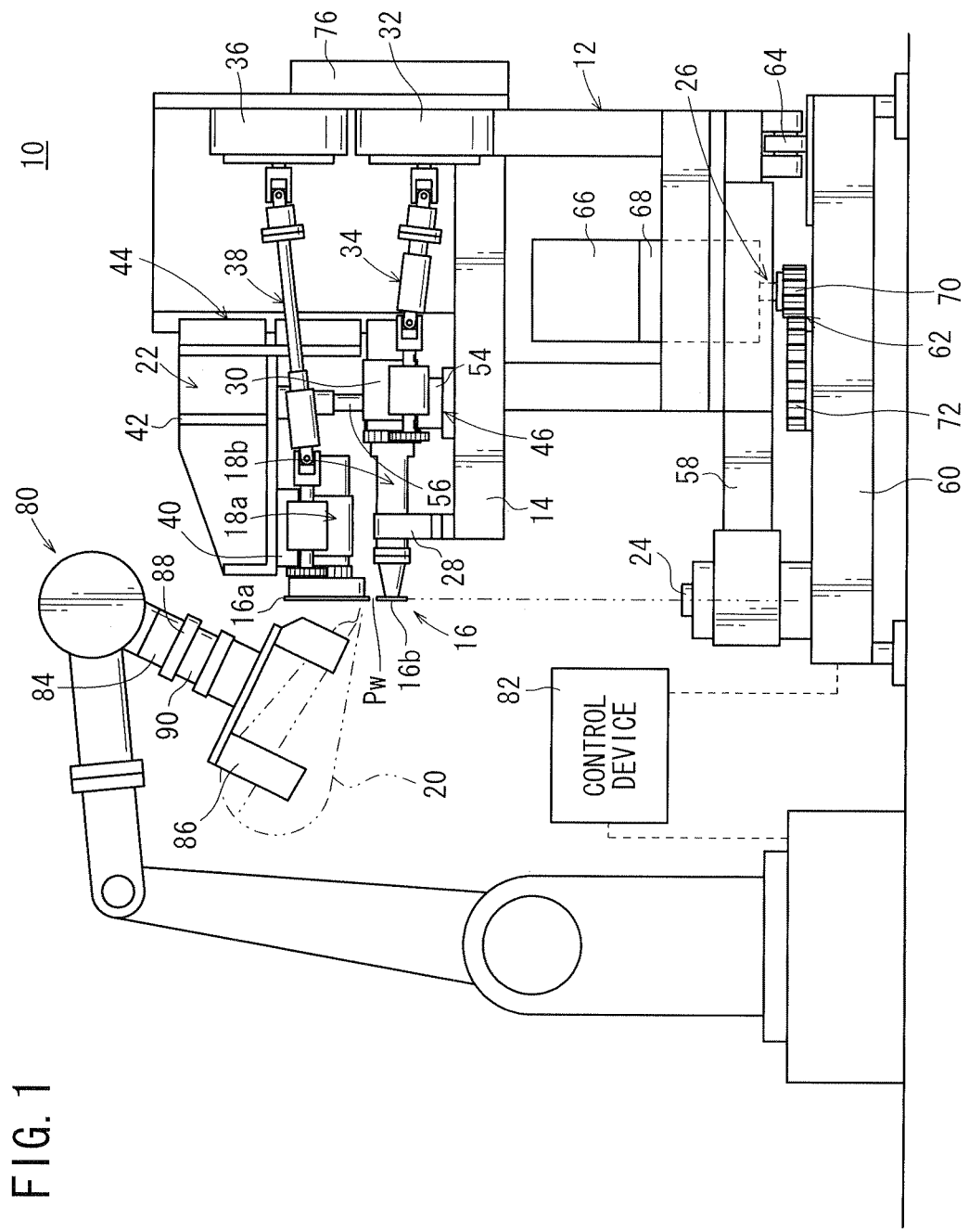
FIG. 1 is a front elevational view of a seam welding apparatus according to an embodiment of the present invention.

FIG. 1 shows in plan a seam welding apparatus 10 according to an embodiment of the present invention. The seam welding apparatus 10 serves to resistance-weld a workpiece 20 which comprises, for example, two superposed pressed members (metal members) while delivering the workpiece 20 between a pair of electrode rolls 16a, 16b.

As shown in FIG. 1, the seam welding apparatus 10 comprises a main body 12 constructed of a plurality of frames, upper and lower electrode mechanisms 18a, 18b mounted on a table 14 of the main body 12 and having an upper electrode roll (electrode roll) 16a and a lower electrode roll (electrode roll) 16b, respectively, a pressing mechanism 22 for pressing a weld region of the workpiece 20 that is sandwiched between the upper electrode roll 16a and the lower electrode roll 16b, the pressing mechanism 22 being capable of adjusting the pressing force, and a turning mechanism 26 (see FIG. 2) for turning the apparatus in its entirety which includes the upper and lower electrode mechanisms 18a, 18b, the pressing mechanism 22, and the main body 12 in an angular range of about 90 degrees about a support post 24 along a horizontal plane. The seam welding apparatus 10 also includes a robot 80 for holding and delivering the workpiece 20 between the upper electrode roll 16a and the lower electrode roll 16b, and a control device 82 as a controller for controlling the apparatus including the robot 80 in its entirety. The upper electrode roll 16a and the lower electrode roll 16b may hereinafter be shown and described collectively as electrode rolls 16.

The lower electrode mechanism 18b comprises a pair of bearings 28, 30 fixedly mounted on the table 14 with the lower electrode roll 16b being rotatably supported by the bearings 28, 30, a lower electrode drive motor 32 for rotating the lower electrode roll 16b in a predetermined direction, and a first universal joint 34 for transmitting rotational drive force from the lower electrode drive motor 32 to the lower electrode roll 16b. The upper electrode mechanism 18a comprises an upper electrode drive motor 36 for rotating the upper electrode roll 16a in a predetermined direction, and a second universal joint 38 for transmitting rotational drive force from the upper electrode drive motor 36 to the upper electrode roll 16a. A welding transformer 76 is fixed to a side surface of the main body 12 in the vicinity of the upper electrode drive motor 36 and the lower electrode drive motor 32.

The upper electrode roll 16a has a diameter greater than the lower electrode roll 16b. Each of the lower electrode drive motor 32 and the upper electrode drive motor 36 may comprise a servomotor, for example.

The pressing mechanism 22 comprises a bracket 42 supporting the upper electrode roll 16a with a spacer 40 interposed therebetween and vertically displaceable along a vertical plane which lies substantially perpendicularly to the surface of the table 14, a guide mechanism 44 for vertically guiding the upper electrode roll 16*a* supported by the bracket 42, and a pressing mechanism 46 for pressing the upper electrode roll 16*a* toward the lower electrode roll 16*b*. The pressing mechanism 46 comprises a pair of pressing actuators in the form of cylinders 54 fixedly mounted on the table 14 and disposed one on each side of the electrode rolls 16 as viewed in side elevation. The pressing actuators include respective piston rods 56 exposed out of the cylinders 54 and coupled to the bracket 42 for causing the electrode rolls 16 to grip the workpiece 20 under desired pressing force.

The turning mechanism 26 comprises a support plate 58 supporting the main body 12 thereon, the support post 24 rotatably mounted on the support plate 58, a base 60 spaced downwardly from the support plate 58 and supporting the support post 24, a turning assembly 62 for turning the support plate 58 horizontally through a predetermined angle about the axis of the support post 24, which is referred to as a turning center axis O, and a plurality of roller members 64 rotatably mounted on the bottom of the support plate 58 for rolling movement on the base 60 when the support plate 58 is turned by the turning assembly 62.

The turning assembly 62 comprises a turning motor 66 fixedly mounted on the support plate 58, a speed reducer 68 combined with the turning motor 66, a pinion 70 coupled to the motor shaft of the turning motor 66, and an arcuate rack 72 fixed to the base 60 and held in mesh with the pinion 70. The turning motor 66 may comprise a servomotor, for example.

Figure 2:
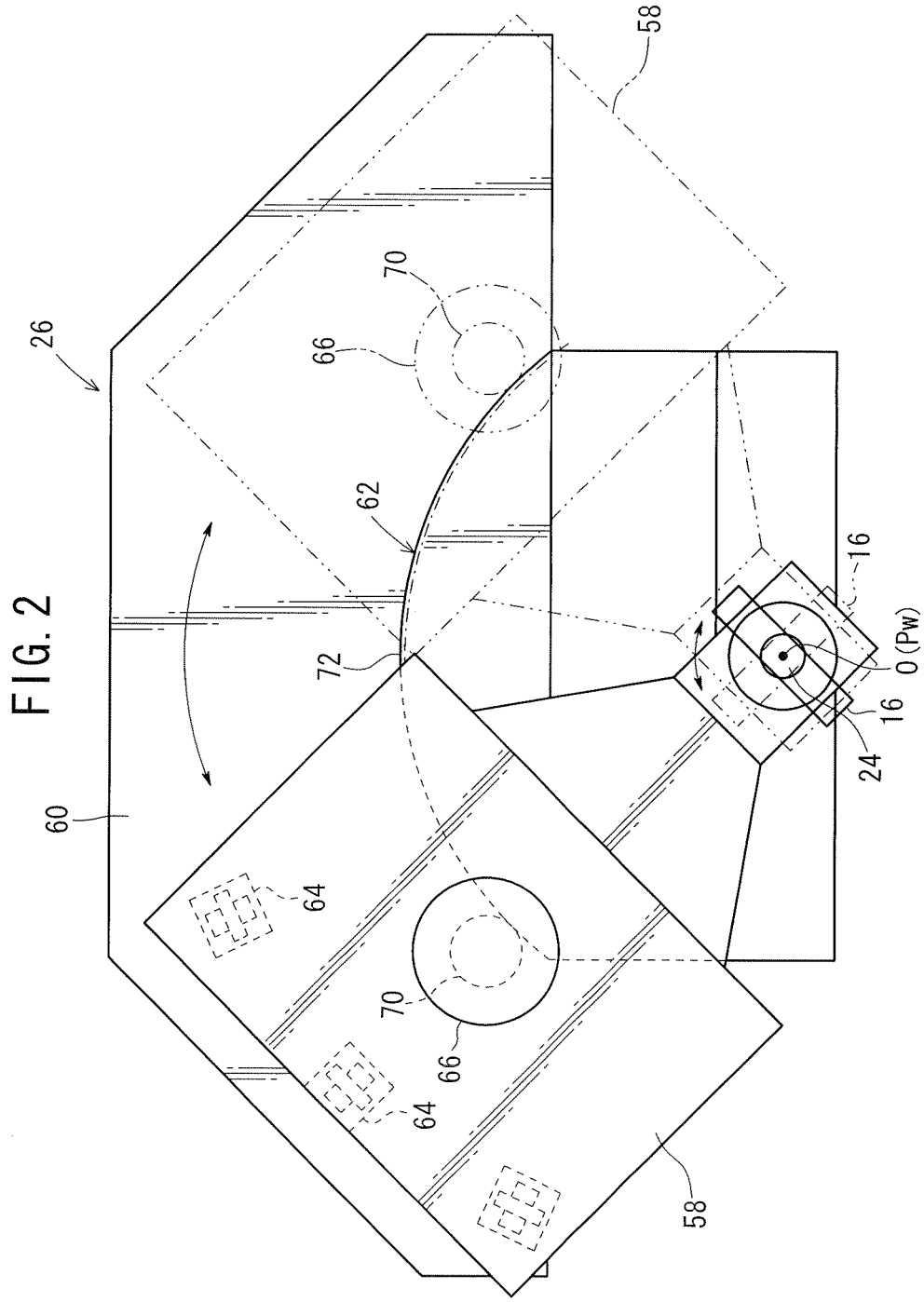
FIG. 2 is a plan view showing the manner in which a turning mechanism shown in FIG. 1 is actuated to turn electrode rolls and a support table through a predetermined angle.

When the turning motor 66 is energized by a power supply (not shown) electrically connected thereto, the pinion 70 is rotated in a certain direction about the axis thereof, causing the pinion 70 and the rack 72 held in mesh therewith to turn the support plate 58 about the support post 24 in an angular range of about 90 degrees along a horizontal plane (see FIG. 2). The turning center axis O extends through a weld point Pw on the workpiece 20 which is delivered between the electrode rolls 16. Therefore, the upper electrode roll 16*a* and the lower electrode roll 16*b* are angularly moved in unison with the support plate 58 in the given angular range about the weld point Pw (see FIGS. 1 and 2). The weld point Pw (gripped point) on the workpiece 20 which is gripped between the electrode rolls 16 and welded and the turning center axis O of the support post 24 are held in vertical alignment with each other (see FIG. 1).

Figure 3:
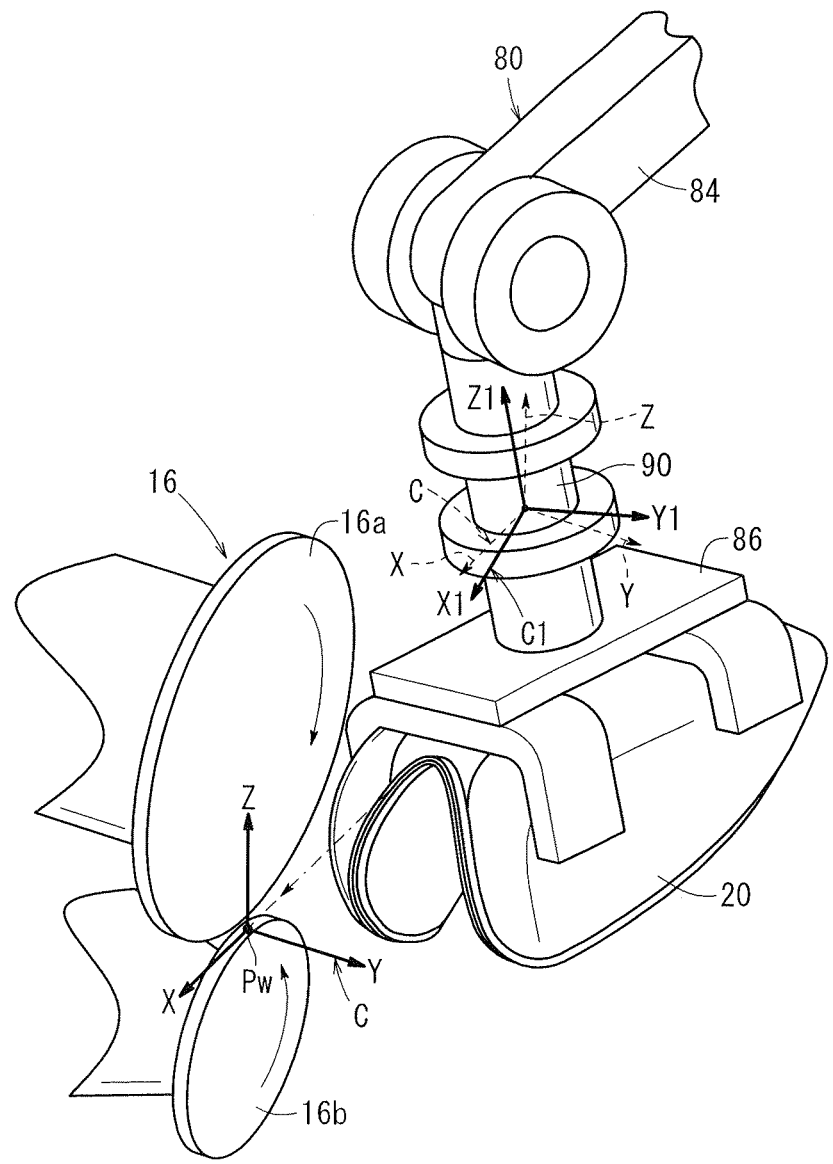
FIG. 3 is a fragmentary perspective view showing the manner in which a workpiece held by a robot is seam-welded while the workpiece is being delivered between electrode rolls.

FIG. 3 show in fragmentary perspective the manner in which the workpiece 20 held by the robot 80 is seam-welded while the workpiece 20 is being delivered between the electrode rolls 16.

As shown in FIGS. 1 and 3, the robot 80 comprises a known industrial multiple-joint robot which is program-operated, and can hold the workpiece 20 with a workpiece holding jig 86 on the tip end of an arm 84 and move the workpiece 20 to a desired position and a desired attitude. The workpiece holding jig 86 is coupled to a flange 88 on the tip end of the arm 84 with a load cell (load detector) 90 interposed therebetween.

The load cell 90 comprises a known six-axis (six-component-force) load cell including a plurality of strain gages fixed to a load bearing member in a flat hollow cylindrical container, not shown. The load cell 90 can detect forces along the directions of three axes, i.e., an X1-axis, a Y1-axis, and a Z1-axis of a load cell coordinate system C1 as an orthogonal coordinate system and three moments about those three axes (the forces and moments are also referred to as six-axis data) (see FIG. 3).

In FIG. 3, there is also shown a reference coordinate system C as another orthogonal coordinate system having a Z-axis (Z direction) along which the electrode rolls 16 press the workpiece 20 at the weld point Pw thereon, an X-axis (X direction) along which the robot 80 delivers the workpiece 20 at the weld point Pw, and a Y-axis (Y direction) which extends perpendicularly to the Z-axis and the X-axis.

Under the control of the control device 82, the robot 80 is operated to deliver the workpiece 20 in the X direction at the weld point Pw at all times according to preset teaching data. While the robot 80 is in operation, the reference coordinate system C is fixed, and the load cell coordinate system C1 is rotated depending on the operating angle of the arm 84 of the robot 80. Therefore, the axes of the reference coordinate system C and the load cell coordinate system C1 are displaced from each other when the seam welding apparatus 10 is in normal welding operation (see FIG. 3).

Figure 4:
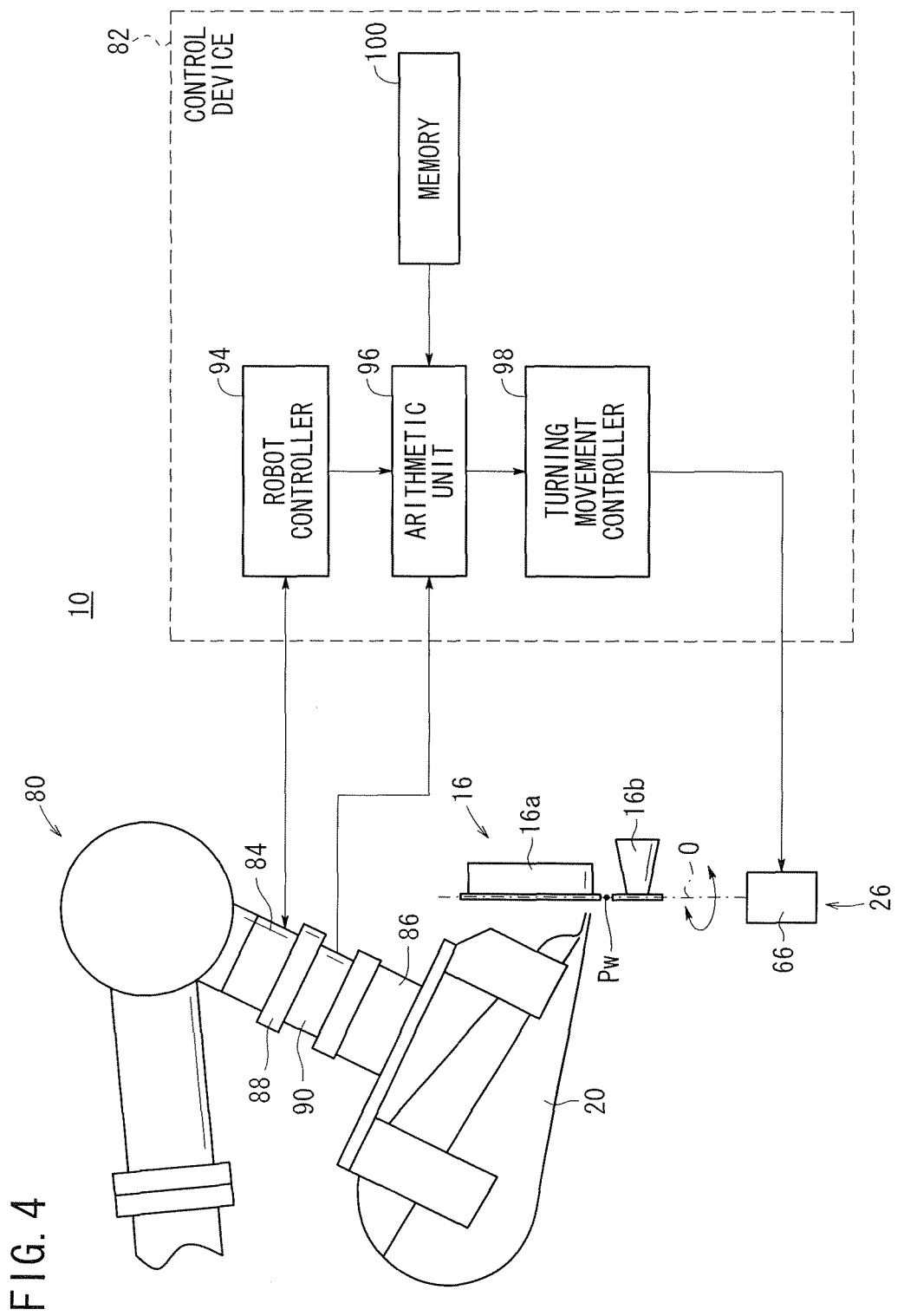
FIG. 4 is a block diagram of a control system of the seam welding apparatus shown in FIG. 1.

FIG. 4 shows in block form a control system of the seam welding apparatus 10 according to the present embodiment.

As shown in FIG. 4, the control system of the seam welding apparatus 10 comprises a robot controller 94 for detecting the operating angle of the arm 84 and actuating the arm 84, an arithmetic unit 96 for performing arithmetic operations on operating angle data of the arm 84 from the robot controller 94 and six-axis data (loads along the axes) from the load cell 90, a turning movement controller 98 for controlling the turning mechanism 26 based on the results of the arithmetic operations from the arithmetic unit 96 to establish a turning angle of the electrode rolls 16, and a memory (storage unit) 100 for storing given information (a first table and a second table to be described later) to be supplied to the arithmetic unit 96.

In the present embodiment, the robot controller 94, the arithmetic unit 96, the turning movement controller 98, and the memory 100 are illustrated as functions of the control device 82 as shown in FIG. 4. However, the robot controller 94, the arithmetic unit 96, the turning movement controller 98, and the memory 100 may be constructed separately from the control device 82.

The seam welding apparatus 10 according to the present embodiment is basically constructed as described above. Operation and advantages of the seam welding apparatus 10 will be described below.

Prior to the description of a welding process, a workpiece 20 to be welded by the seam welding apparatus 10 will be described below.

Figure 5:
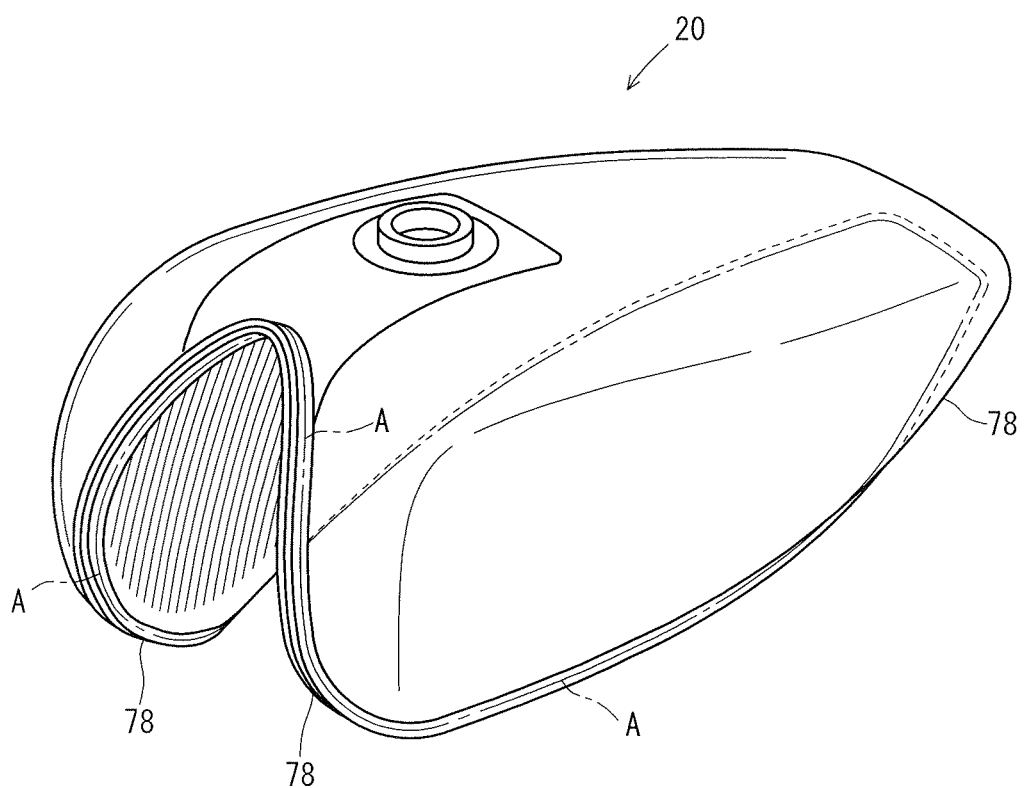
FIG. 5 is a perspective view of an example of the workpiece that is welded by the seam welding apparatus shown in FIG. 1.

As shown in FIG. 5, the workpiece 20 according to the present embodiment is used as a fuel tank for use on a motorcycle, and comprises two pressed members having respective outer circumferential portions 78 superposed on each other. The outer circumferential portions 78 are seam-welded to each other at welding regions along a target welding track A (see the dot-and-dash line in FIG. 5) represented by two-dimensional and three-dimensional composite curves which are complex in shape. The workpiece 20 to be welded by the seam welding apparatus 10 may alternatively comprise a fuel tank for use on other vehicles such as four-wheeled vehicles, a can, an electric device, or any of various industrial products.

In the welding process, the workpiece 20 is initially held by the arm 84 of the robot 80 with the workpiece holding jig 86.

When the arm 84 is actuated, the workpiece 20 held thereby can easily be displaced to a desired attitude and delivered along the target welding track A between the electrode rolls 16 (see FIGS. 1 and 3). Under the control of the control device 82, the movement of the workpiece 20 delivered by the upper electrode roll 16*a* and the lower electrode roll 16*b* that are rotated respectively by the upper electrode drive motor 36 and the lower electrode drive motor 32, and the movement of the workpiece 20 delivered by the arm 84 are synchronized with each other. The upper electrode drive motor 36 and the lower electrode drive motor 32 are controlled for their rotational speeds by motor control signals output from the control device 82. The control device 82 is supplied in advance with desired numerical control information corresponding to the target welding track A, etc., and the robot 80 is controlled for its various actions based on robot control signals output from the robot controller 94.

Figure 6:
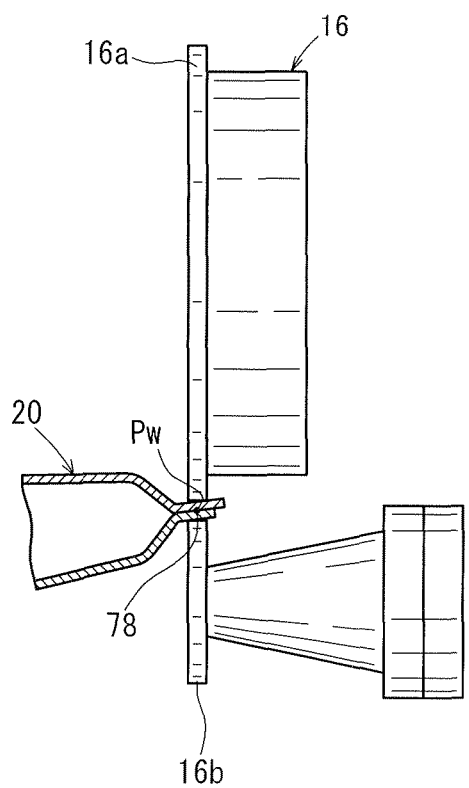
FIG. 6 is a fragmentary front elevational view showing the manner in which the workpiece is gripped between the electrode rolls and welded.

Then, the arm 84 is operated to bring the superposed outer circumferential portions 78 of the workpiece 20 so as to be gripped between the upper electrode roll 16a and the lower electrode roll 16b (see FIG. 6).

The upper electrode roll 16a and the lower electrode roll 16b are preliminarily spaced a given distance from each other by the pressing mechanism 22. When the cylinder 54 is supplied with a fluid under pressure, the piston rod 56 is displaced downwardly to lower the bracket 42 and the upper electrode roll 16a in unison along the guide mechanism 44. The superposed outer circumferential portions 78 (a welding start position) of the workpiece 20 are now gripped between the upper electrode roll 16a and the fixed lower electrode roll 16b. The cylinder 54 displaces the upper electrode roll 16a downwardly to apply a given pressing force to the superposed outer circumferential portions 78. The pressing force is applied along the Z-axis in FIG. 3, i.e., in alignment with the turning center axis O.

Then, the control device 82 controls a power supply device, not shown, to supply an electric current to the upper electrode roll 16a and the lower electrode roll 16b which have gripped the superposed outer circumferential portions 78 of the workpiece 20. At the same time, the upper electrode roll 16a and the lower electrode roll 16b are rotated to seam-weld the superposed outer circumferential portions 78 of the workpiece 20 along the target welding track A (see FIG. 6).

Figure 7A:
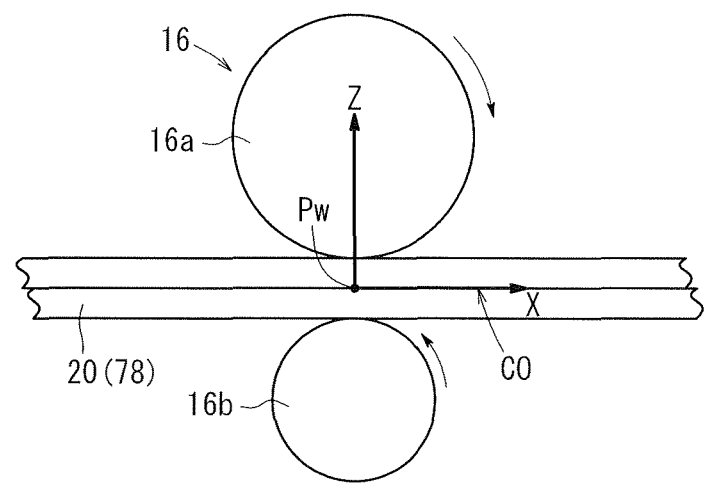
FIG. 7A is a schematic side elevational view showing the manner in which the workpiece is welded while being delivered between the electrode rolls.
Figure 7B:
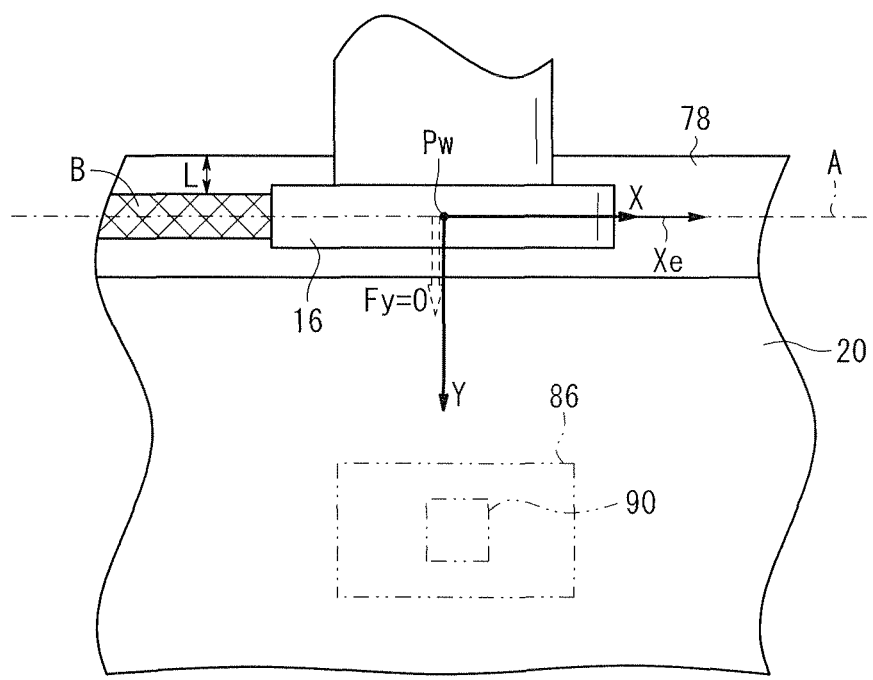
FIG. 7B is a fragmentary plan view showing the manner in which the workpiece is welded while being delivered between the electrode rolls.

While the workpiece 20 is being appropriately (ideally) seam-welded, the direction X along which the workpiece 20 is delivered by the robot 80 at the weld point Pw and the direction Xe along which the workpiece 20 is delivered by the electrode rolls 16 are aligned with each other, as shown in FIGS. 7A and 7B.

If the delivering directions X, Xe are aligned with each other and the actual welding track (referred to as a welding line B) along which the workpiece 20 is actually welded is aligned with the target welding track A, as shown in FIG. 7B, then a Y-direction load Fy imposed as a force along the Y direction of the reference coordinate system C is nil (0) (see the broken-line arrow in FIG. 7B). Therefore, the workpiece 20 can be welded accurately while being stably delivered in the X direction. As the welding line B and the target welding track A are aligned with each other, the distance (flange position) L from the edge of the outer circumferential portions 78 to the welding line B is in agreement with a desired preset distance that has been taught, allowing the workpiece 20 to be welded at a high quality level.

When the workpiece 20 is actually welded, however, the workpiece 20 may be flexed or skewed to a certain degree due to the resistance which the electrode rolls 16 receive from the workpiece 20, with the result that the delivering direction Xe by the electrode rolls 16 may deviate from the target welding track A, tending to cause the electrode rolls 16 to derail off or bite into the workpiece 20. If the electrode rolls 16 derail off or bite into the workpiece 20, then the direction X along which the workpiece 20 is delivered by the robot 80 and the direction Xe along which the workpiece 20 is delivered by the electrode rolls 16 are brought out of alignment with each other. Therefore, the delivering direction X and the delivering direction Xe are oriented across each other at the welding point Pw (see FIGS. 8A and 8B), causing the welding line (weld bead) B representing the actual welding track to deviate from the target welding track A.

Figure 8A:
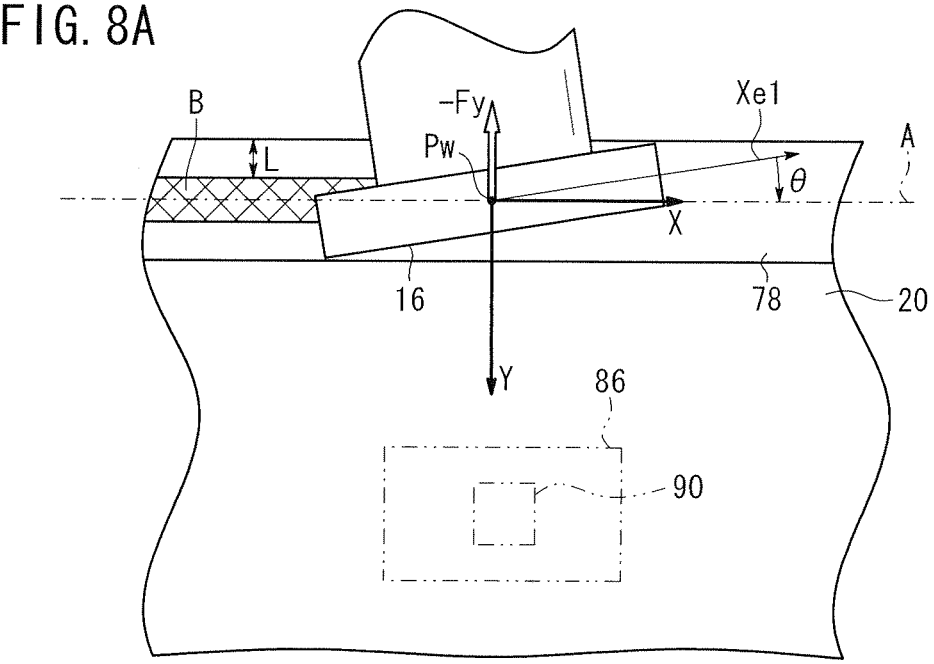
FIG. 8A is a fragmentary plan view showing the manner in which the electrode rolls exhibit a derailing tendency when the workpiece is welded while being delivered between the electrode rolls.

Specifically, if the electrode rolls 16 exhibit a derailing tendency, as shown in FIG. 8A, then the electrode rolls 16 are tilted such that their leading ends are displaced outwardly with respect to the workpiece 20, as shown by the direction indicated by the arrow Xe1, causing the actual welding track to deviate outwardly from the target welding track A. If the electrode rolls 16 exhibit a biting tendency, as shown in FIG. 8B, then the electrode rolls 16 are tilted such that their leading ends are displaced inwardly with respect to the workpiece 20, as shown by the direction indicated by the arrow Xe2, causing the actual welding track to deviate inwardly from the target welding track A.

Figure 8B:
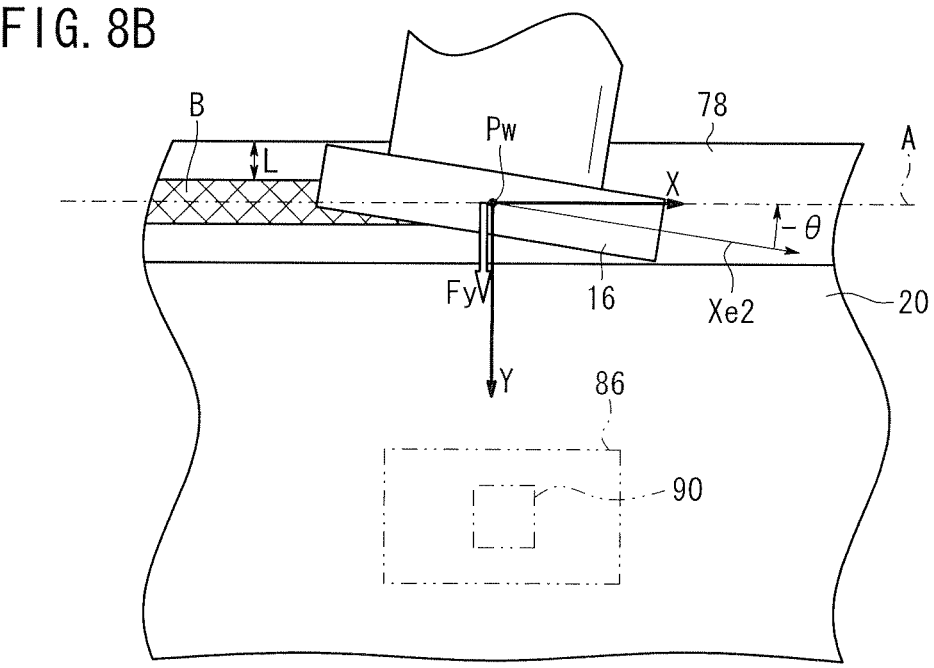
FIG. 8B is a fragmentary plan view showing the manner in which the electrode rolls exhibit a biting tendency when the workpiece is welded while being delivered between the electrode rolls.

As can be seen from FIGS. 8A and 8B, when the electrode rolls 16 exhibit the derailing or biting tendency, they are subjected to a Y-direction load Fy (−Fy), i.e., load in the Y direction of the reference coordinate system C. The actual welding track produced by the electrode rolls 16 deviates from the target welding track A, and becomes unstable. The distance L from the edge of the outer circumferential portions 78 to the welding line B also varies, resulting in a reduction in the welding quality of the workpiece 20.

As described above, if the actual welding track is in alignment with the target welding track A, then the Y-direction load Fy is nil, and the workpiece 20 is appropriately welded by the seam welding apparatus 10. Conversely, if the actual welding track is not in alignment with the target welding track A, then the Y-direction load Fy is of a value which is not nil. In other words, it is possible to determine whether the workpiece 20 is appropriately welded or not by monitoring the detected value of the Y-direction load Fy.

A seam welding method according to the present embodiment for welding the workpiece 20 while correcting any deviations of the actual welding track from the target welding track A will be described below with reference to a flowchart shown in FIG. 9.

When the seam welding apparatus 10 starts seam-welding the workpiece 20, the robot controller 94 actuates the arm 84 of the robot 80 to deliver, in the direction X, the workpiece 20 gripped between the electrode rolls 16 along the target welding track A that has been taught in advance (see FIGS. 3 and 7B). At the same time, the electrode rolls 16 are rotated to deliver the workpiece 20 in the delivering direction Xe to weld the workpiece 20 (see FIG. 7B).

Figure 9:
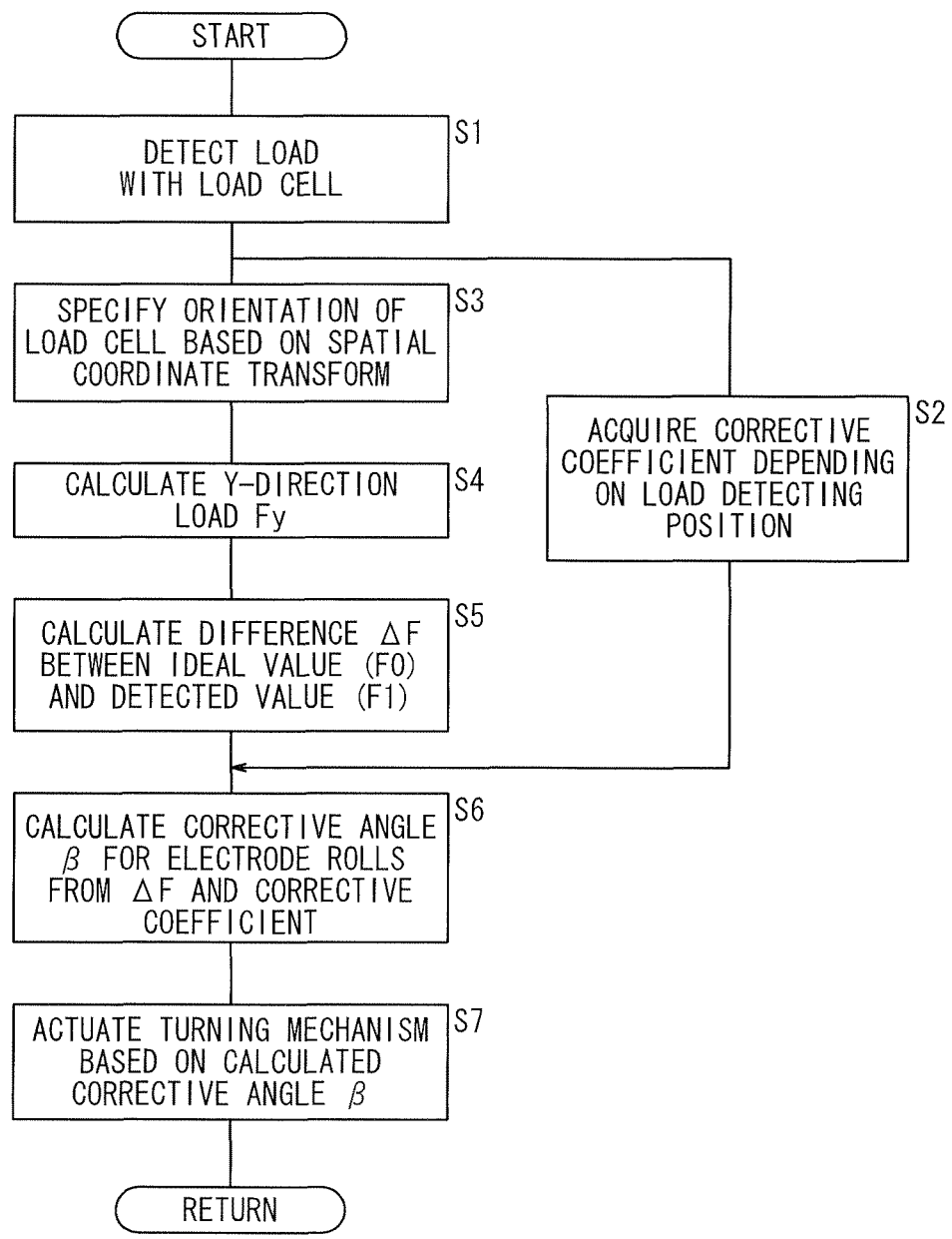
FIG. 9 is a flowchart of a control sequence of a seam welding method according to an embodiment of the present invention.

In step S1 shown in FIG. 9, the load cell 90 detects loads (six-axis data) at given time intervals or substantially continuously, for example, under the control of the control device 82.

In step S3, the arithmetic unit 96 is supplied with the load data (six-axis data) from the load cell 90 which have been detected in step S1 and operating angle data of the arm 84 at the time the load data have been detected. The arithmetic unit 96 then performs a spatial coordinate transform using rotating matrixes, for example, based on the preset axis data of the reference coordinate system C and the supplied operating angle data, thereby specifying a deviation of the load cell coordinate system C1 from the reference coordinate system C (see FIG. 3), i.e., an orientation of the load cell 90 in the reference coordinate system C.

In step S4, loads along the axes of the reference coordinate system C are calculated based on the load data from the load cell 90, and a Y-direction load Fy which represents a load (force) applied in the Y direction is extracted from the detected loads (see FIGS. 8A and 8B). At this time, the load cell 90, the robot controller 94, and the arithmetic unit 96 jointly function as a load detector for detecting the Y-direction load Fy.

The Y-direction load Fy calculated in step S4 represents a force component in the Y direction which is perpendicular to the direction X along which the workpiece 20 is delivered by the robot 80 and the pressing direction Z along which the workpiece 20 is pressed by the electrode rolls 16. Therefore, if the calculated Y-direction load Fy is of a value which is not nil, then it is possible to determine quickly and accurately whether the electrode rolls 16 derail or bite or exhibit a derailing or biting tendency, or stated otherwise, whether the actual welding track deviates from (or is deviating from) the target welding track A (see FIGS. 7A, 7B, 8A, and 8B).

In step S5, it is determined how much the detected value (F1) of the Y-direction load Fy is different from an ideal value (F0) as a master load. In other words, the difference $\Delta F$ (F1−F0) between the detected value (F1) of the Y-direction load Fy and the ideal value (F0) is calculated. The ideal value (F0) represents a Y-direction load (master data) at the time the actual welding track is aligned with the target welding track A and the workpiece W is accurately welded. In the present embodiment, as described above, the ideal value (F0) is nil as shown in FIG. 7B. In step S5, since the ideal value (F0) is nil, the detected value (F1) and the difference $\Delta F$ agree with each other, i.e., the difference $\Delta F$=the detected value (F1)=the Y-direction load Fy, and no essential calculations are required.

According to the present embodiment, as described above, if the difference $\Delta F$ calculated in step S5 is nil, then the workpiece 20 is accurately welded along the target welding track A. Conversely, if the difference $\Delta F$ calculated in step S5 is of a value which is not nil, then it can easily and accurately be judged that the electrode rolls 16 are tilted, i.e., are derailing or biting, with respect to the workpiece 20 (see FIGS. 7B, 8A, and 8B).

The magnitude of the difference $\Delta F$ (the Y-direction load Fy) may be considered to correspond to the magnitude of the deviation (deviating angle) of the direction Xe along which the workpiece 20 is delivered by the electrode rolls 16, from the direction X along which the workpiece 20 is delivered by the robot 80. Stated otherwise, the deviation of the actual welding track from the target welding track A can be detected from the magnitude of the difference $\Delta F$ (the Y-direction load Fy). If the difference $\Delta F$ is small, then it can be judged that the deviation of the actual welding track due to a derailing or biting tendency of the electrode rolls 16 is small, and conversely, if the difference $\Delta F$ is large, then it can be judged that the deviation of the actual welding track due to a derailing or biting tendency of the electrode rolls 16 is large. The derailing or biting tendency of the electrode rolls 16 can thus be corrected to correct the actual welding track based on the difference $\Delta F$ which represents the detected value (F1), by turning the electrode rolls 16 about the turning center axis O by an angle corresponding to the difference $\Delta F1$.

In the seam welding apparatus 10, the memory 100 of the control device 82 stores a first table shown in FIG. 10. The first table shown in FIG. 10 represents a correspondence table showing a correspondence relationship between Y-direction loads Fy [kN] and corresponding corrective angles $\alpha$ [°] for the turning angle of the electrode rolls 16. If the Y-direction load Fy is nil, then since the actual welding track does not deviate, the corrective angle is 0° (zero), and if the Y-direction load Fy is 0.2 kN, then the actual welding track can be corrected by turning the electrode rolls 16 by 0.5°.

Specifically, if the electrode rolls 16 exhibit a derailing tendency, as shown in FIG. 8A, then since the delivering direction by the electrode rolls 16 is the direction indicated by the arrow Xe1, the Y-direction load Fy is detected as a negative load, e.g., −0.2 kN (see the numerical value in parenthesis in FIG. 10). In this case, the electrode rolls 16 are turned 0.5° in the direction indicated by the arrow $\theta$ in FIG. 8A to correct the delivering direction Xe1 toward the target welding track A (X-axis) for thereby correct the derailing deviation of the electrode rolls 16.

Conversely, if the electrode rolls 16 exhibit a biting tendency, as shown in FIG. 8B, then since the delivering direction by the electrode rolls 16 is the direction indicated by the arrow Xe2, the Y-direction load Fy is detected as a positive load, e.g., 0.2 kN (see in FIG. 10). In this case, the electrode rolls 16 are turned 0.5° in the direction indicated by the arrow $-\theta$ in FIG. 8B to correct the delivering direction Xe2 toward the target welding track A (X-axis) for thereby correct the biting deviation of the electrode rolls 16.

If the workpiece 20 is a rigid body which is completely free of flexing or skewing during seam welding (rigid workpiece), then the magnitude of the difference $\Delta F$ (Y-direction load Fy) and the deviating angle of the electrode rolls 16 in the delivering direction Xe are substantially in one-to-one correspondence, allowing a corrective angle $\alpha$ to be uniquely determined from the Y-direction load Fy, as shown in the first table shown in FIG. 10.

Actually, the workpiece 20 has different rigidity values in various regions (various positions) thereof on the target welding track A. Inasmuch as the Y-direction load Fy is detected by the load cell 90 through the workpiece holding jig 86 from the outer circumferential portions 78 of the workpiece 20, the actually produced loads may be partially absorbed between the weld point Pw and the load cell 90, and may be absorbed to different degrees depending on the distance from the weld point Pw to the load cell 90 and the rigidity therebetween.

Therefore, the Y-direction load Fy, i.e., the load data detected by the load cell 90, varies depending on the characteristics at each position on the target welding track A (hereinafter referred to as workpiece position characteristics), including the rigidity of the various regions of the workpiece 20, the position where the workpiece holding jig 86 holds the workpiece 20, and the distance up to the load cell 90. It may be difficult to accurately correct deviations of the welding track, especially if the workpiece 20 has a complex shape, by correcting the turning angle of the electrode rolls 16 only based on the correspondence relationship represented by the first table shown in FIG. 10.

With the seam welding method according to the present embodiment, the memory 100 also stores a second table shown in FIG. 11, and step S2 is carried out in parallel with steps S3 through S5 shown in FIG. 9.

Figure 12:
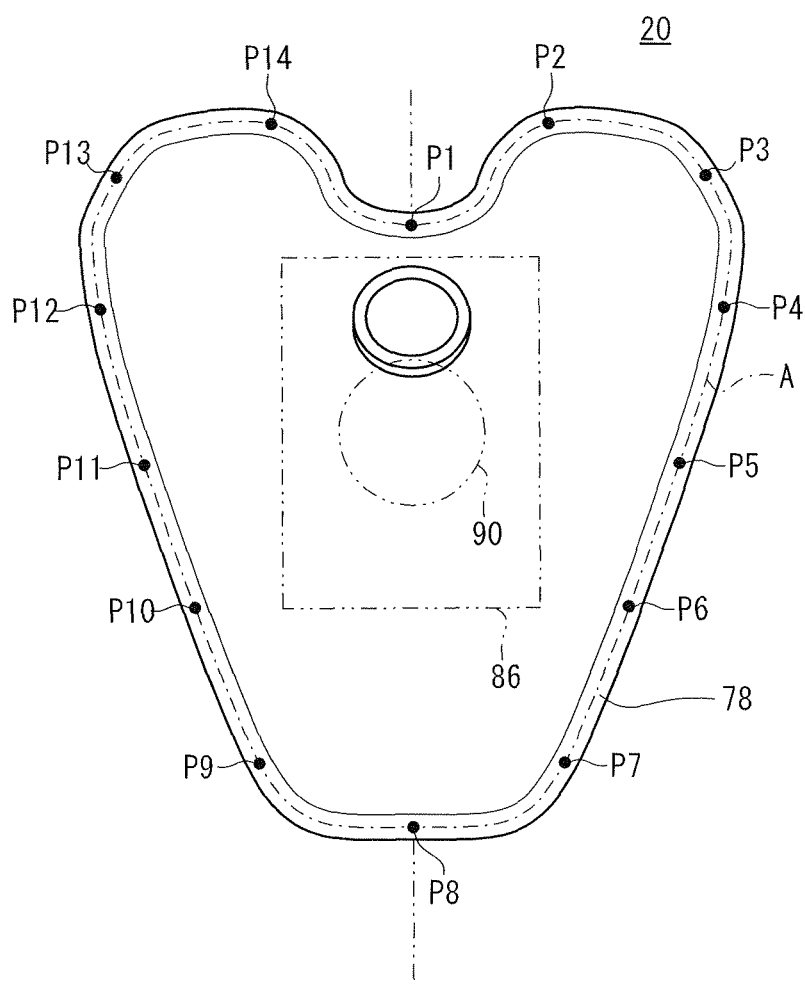
FIG. 12 is a plan view showing load detecting positions on a target welding track on the workpiece.

The second table shown in FIG. 11 represents a correspondence table showing a correspondence relationship between load detecting positions of the load cell 90, workpiece position characteristics at respective welding positions, and corresponding corrective coefficients. The load detecting positions refer to positions on the target welding track A where load data are acquired by the load cell 90 in step S1. In the present embodiment, as shown in FIG. 12, points P1 through P14 are assigned to the respective positions on the target welding track A which serve as welding regions of the workpiece 20, and the load cell 90 detects loads at the positions P1 through P14. More positions or less positions than the positions P1 through P14 may be present on the target welding track A as load detecting positions.

As shown in FIGS. 11 and 12, in the load detecting positions P1 through P2, the workpiece position characteristics (e.g., rigidity) are high, and the difference between the load detected by the load cell 90 and the load actually imposed when the workpiece 20 is welded (hereinafter referred to as actual load) is considered to be essentially nil. Therefore, a corrective coefficient of 1.0 is set in the load detecting positions P1, P2. In the load detecting positions P4 through P6, since the workpiece position characteristics (e.g., rigidity) are low, the difference between the load detected by the load cell 90 and the actual load is considered to be large, i.e., the load imposed on the weld point Pw is considered to be significantly absorbed between the weld point Pw and the load cell 90 and hence to be small. Therefore, a corrective coefficient of 2.0 is set in the load detecting positions P4 through P6.

In step S2, in response to the detection of the load in step S1, the robot controller 94 determines where the load detecting position is located on the target welding track A between the positions P1 and P14, and supplies the determined load detecting position to the arithmetic unit 96. The arithmetic unit 96 reads the second table shown in FIG. 11 from the memory 100, and acquires a corrective coefficient corresponding to the supplied load detecting position from the second table. For example, if the load detecting position in step S1 is located somewhere between the positions P2 and P4, then the arithmetic unit 96 acquires the corrective coefficient of 1.5.

In step S6, after steps S1 through S5, the arithmetic unit 96 corrects the difference ΔF (Y-direction load Fy) calculated in step S5 by multiplying the same by the corrective coefficient acquired in step S2, and acquires a corrective angle α corresponding to the corrected difference ΔF from the first table shown in FIG. 10 as a corrective angle β based on the corrected difference ΔF.

For example, if the load detecting position in step S1 is located somewhere between the positions P2 and P4, and the detected value (F1) of the Y-direction load Fy, i.e., the difference ΔF, is 0.4 kN, then the arithmetic unit 96 judges that a load of 0.6 kN, which is obtained by multiplying 0.4 kN by the corrective coefficient of 1.5, is an actual load imposed on the weld point Pw in the Y direction, and outputs a command representing −1.5° as the corrective angle β to the turning movement controller 98 based on the first table shown in FIG. 10. In step S7, the turning mechanism 26 is actuated by the turning movement controller 98 to turn the electrode rolls 16 by −1.5° (see FIG. 2). The actual welding track is thus quickly and appropriately corrected even if the electrode rolls 16 have derail or bite during the welding process.

It has been described that the difference ΔF (Y-direction load Fy) is corrected using a corrective coefficient, and a corrective angle α is acquired as a corrective angle β from the first table shown in FIG. 10 based on the corrected difference ΔF. However, a corrective angle α may first be acquired based on the calculated difference ΔF (Y-direction load Fy), and the acquired corrective angle α may be corrected using a corrective coefficient based on the load detecting position (workpiece position characteristics) to provide a corrective angle β.

If the workpiece 20 is properly welded without the electrode rolls 16 derailing off or biting into the workpiece 20, then since the Y-direction load Fy calculated in step S4 is nil, the difference ΔF calculated in step S5 is also nil, and the corrective angle β (corrective angle α) calculated in step S6 is also nil. Therefore, the electrode rolls 16 are not turned.

With the seam welding method according to the present embodiment, accordingly, the control process based on the control sequence shown in FIG. 9 is carried out to keep the electrode rolls 16 unturned when the electrode rolls 16 do not derail off or bite into the workpiece 20 and the workpiece 20 is properly welded, and to correct the welding track quickly and reliably when the electrode rolls 16 have derailed off or bitten into the workpiece 20.

Figure 13A:
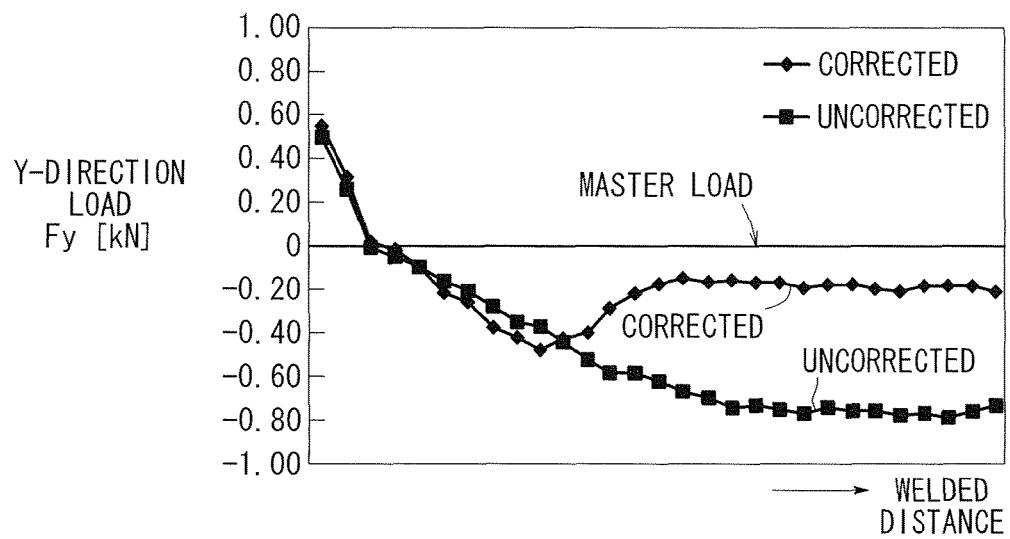
FIG. 13A is a graph showing behaviors of a Y-direction load (load behaviors) in an example wherein the robot is taught to cause the electrode rolls to derail on a trial basis.
Figure 13B:
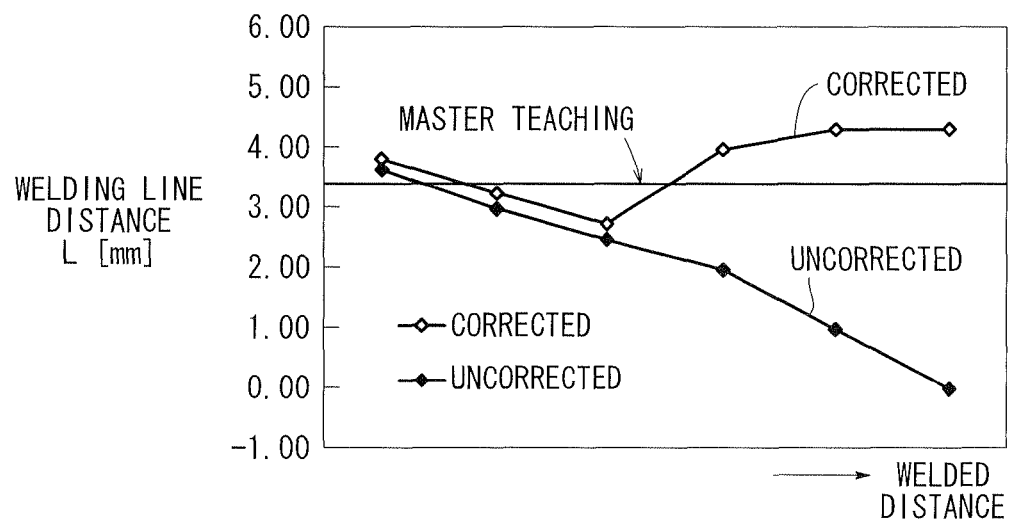
FIG. 13B is a graph showing behaviors of the welding line on the workpiece in the example shown in FIG. 13A.
Figure 14A:
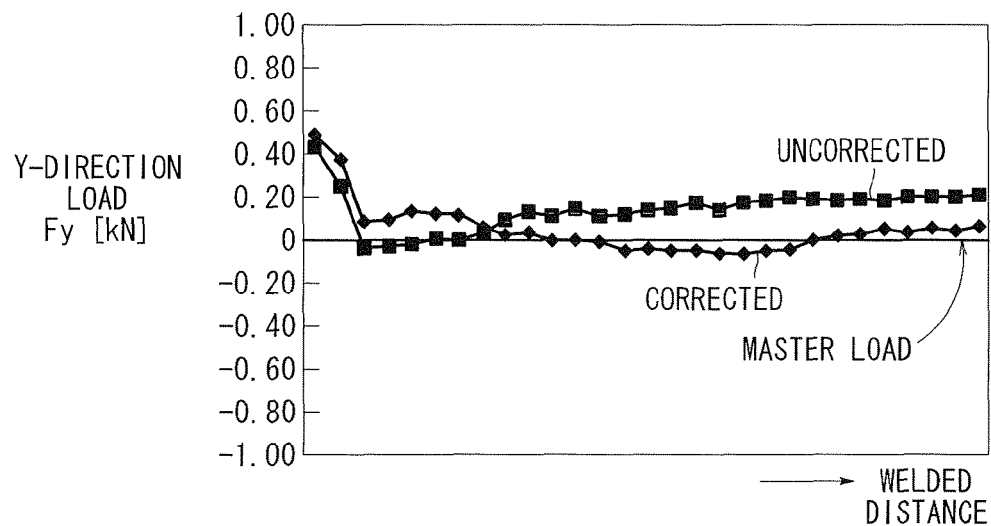
FIG. 14A is a graph showing behaviors of a Y-direction load (load behaviors) in an example wherein the robot is taught to cause the electrode rolls to bite on a trial basis.
Figure 14B:
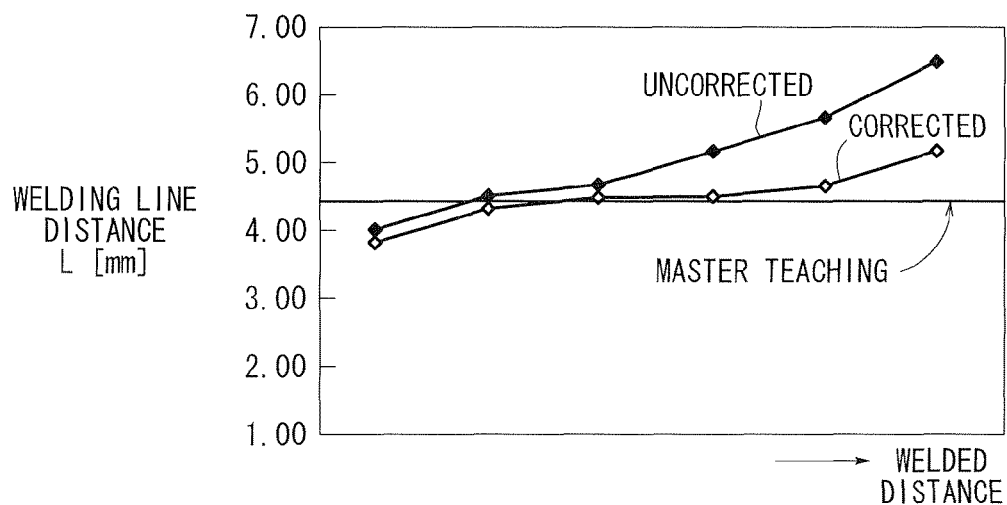
FIG. 14B is a graph showing behaviors of the welding line on the workpiece in the example shown in FIG. 14A.

FIG. 13A is a graph showing behaviors of the Y-direction load Fy (load behaviors) in an example wherein the robot 80 is taught to cause the electrode rolls 16 to derail (see FIG. 8A) on a trial basis. FIG. 13B is a graph showing behaviors of the welding line on the workpiece 20 (flange behaviors) in the example shown in FIG. 13A. FIG. 14A is a graph showing behaviors of the Y-direction load Fy (load behaviors) in an example wherein the robot 80 is taught to cause the electrode rolls 16 to bite (see FIG. 8B) on a trial basis. FIG. 14B is a graph showing behaviors of the welding line on the workpiece 20 (flange behaviors) in the example shown in FIG. 14A. FIGS. 13A through 14B each show both data produced when the turning angle of the electrode rolls 16 are corrected by the seam welding method according to the present embodiment, and data produced when the turning angle of the electrode rolls 16 are not corrected by the seam welding method according to the present embodiment.

A master load shown in FIGS. 13A and 14A refers to an ideal Y-direction load Fy imposed at the time the workpiece 20 is accurately welded, and is nil in the present embodiment. The behaviors of the welding line B shown in FIGS. 13B and 14B refer to changes in the distance L (see FIG. 7B) from the edge of the outer circumferential portions 78 to the welding line B. In an ideal welding state wherein the workpiece 20 is accurately welded, the welding-line distance L is in agreement with a distance L given according to a master teaching process, i.e., a teaching process based on the master data.

As can be seen from FIGS. 13A, 13B and 14A, 14B, even if the robot 80 is taught to cause the electrode rolls 16 to derail off or bite into the workpiece 20, when the Y-direction load Fy is corrected by the seam welding method according to the present embodiment, it is corrected so as to be closer to the master load, and the welding-line distance L is also corrected so as to be closer to the line given according to the master teaching process. Accordingly, the workpiece 20 is welded at a higher quality level than if the Y-direction load Fy and the welding-line distance L are not corrected.

According to the seam welding method based on the control sequence shown in FIG. 9, in view of different workpiece position characteristics such as rigidity in various regions of the workpiece 20, the detected Y-direction load Fy is corrected by a corrective coefficient read from the second table shown in FIG. 11 to calculate a corrective angle β, and a turning angle of the electrode rolls 16 is determined based on the corrective angle β.

However, if a workpiece to be welded is highly rigid or so small that it is not affected by different rigidity levels or has a substantially uniform rigidity throughout various regions thereof, then the step of correcting the turning angle of the electrode rolls 16 with a corrective coefficient may be dispensed with, and hence the overall welding process may be simplified.

FIG. 15 is a flowchart of a control sequence of a seam welding method according to a modification of the embodiment shown in FIG. 9. Those steps of the control sequence shown in FIG. 15 which are denoted by the step numbers (S1, etc.) that are identical to those shown in FIG. 9 perform similar or identical operations, and will not be described in detail below.

The seam welding method shown in FIG. 15 is basically the same as the seam welding method shown in FIG. 9 except that step S6 shown in FIG. 9 is replaced with step S6a and step S2 shown in FIG. 9 is dispensed with.

In step S6a shown in FIG. 15, the arithmetic unit 96 acquires a corrective angle α from the first table shown in FIG. 10 based on the difference ΔF (Y-direction load Fy) calculated in step S5. For example, if the load detecting position in step S1 is located somewhere between the positions P2 and P4, and the Y-direction load Fy (difference ΔF) is 0.4 kN, then the arithmetic unit 96 outputs a command representing −1.0° as the corrective angle β to the turning movement controller 98 based on the first table shown in FIG. 10. In step S7, the turning mechanism 26 is actuated by the turning movement controller 98 to turn the electrode rolls 16 by −1.0° (see FIG. 2).

As described above, if the workpiece position characteristics such as rigidity do not need to be taken into account, e.g., if the workpiece to be welded is highly rigid or very small, then the magnitude of the difference ΔF (Y-direction load Fy) and the deviating angle of the electrode rolls 16 in the delivering direction Xe (see FIGS. 8A and 8B) are substantially in one-to-one correspondence, and a corrective angle α can be determined substantially uniquely from the Y-direction load Fy as indicated by the first table shown in FIG. 10. Accordingly, the seam welding method according to the present modification is effective to achieve the required welding quality of the workpiece, and can simplify the control process. If a workpiece to be welded has a substantially uniform rigidity throughout various regions thereof, i.e., if the workpiece position characteristics at the respective load detecting positions are substantially identical, then the corrective angles α of the first table shown in FIG. 10 may be set in advance to values corresponding to the Y-direction load Fy multiplied by corrective coefficients based on the workpiece position characteristics, and stored in the memory 100.

With the seam welding apparatus and the seam welding method according to the present embodiment, as described above, the Y-direction load is detected which is applied along the Y direction that is perpendicular to the Z direction along which the electrode rolls 16 press the workpiece 20 at the weld point Pw and the X direction along which the robot 80 delivers the workpiece 20 at the weld point Pw, and the electrode rolls 16 are turned through the corrective angle α based on the magnitude of the detected value of the Y-direction load. If the workpiece 20 is properly welded without the electrode rolls 16 derailing off or biting into the workpiece 20, then since the Y-direction load Fy is nil, calculations for establishing and acquiring a master load (master data) and for comparing the master load with the detected value are not required. Therefore, whether the actual welding track deviates from the target welding track or not can be detected easily and quickly, and deviations of the actual welding track from the target welding track can be corrected appropriately.

Workpiece position characteristics such as rigidity at various positions on the target welding track A on the workpiece 20 are established, and the detected Y-direction load Fy is corrected using a corrective coefficient established based on the workpiece position characteristics. Consequently, the corrective quantity for the actual welding track can be adjusted appropriately depending on the rigidity of the welding region of the workpiece 20, so that the workpiece 20 can be welded at a high quality level.

According to the present embodiment, furthermore, even if the workpiece 20 is changed in shape, rigidity, or welding rate, it can be handled simply by establishing corresponding data in the tables shown in FIGS. 10 and 11, and there is no need for a plurality of experiments to acquire master data. Consequently, a plurality of workpieces of various different shapes can be seam-welded while deviations of their welding tracks from target welding paths are easily and accurately corrected.

Although certain preferred embodiments of the present invention have been shown and described in detail, it should be understood that various changes and modifications may be made therein without departing from the scope of the appended claims.

For example, the turning mechanism 26 for turning the electrode rolls 16 may be of any structure capable of turning the pair of electrode rolls 16 about the weld point Pw, and is not limited to the structure shown in FIGS. 1 and 2.

Also, the nil (zero) value of the Y-direction load covers not only a detected value which is completely nil, but also a given range (error range) about the nil value which is established in view of noise produced by the load cell, for example.

Further, in the above embodiment, the Y-direction load is detected by the load cell. However, any arrangement or detector for finally detecting the Y-direction load may be employed. The load cell may be installed in any position capable of appropriately detecting and calculating the Y-direction load, rather than between the workpiece holding jig and the flange of the robot.

What is claimed is:

1. A seam welding method of seam-welding a workpiece held by a robot while delivering the workpiece between a pair of electrode rolls, comprising the steps of:
   detecting a load imposed along a direction which is perpendicular to a pressing direction along which the electrode rolls press the workpiece at a weld point and a delivering direction along which the robot delivers the workpiece at the weld point; and
   turning the electrode rolls about the pressing direction by an angle depending on the magnitude of the detected load.

2. A seam welding method according to claim 1, wherein the step of turning the electrode rolls comprises the steps of:
   acquiring, from a table storing a correspondence relationship between magnitudes of the load and corrective angles for the electrode rolls, one of the corrective angles which corresponds to the magnitude of the detected load; and
   turning the electrode rolls by the acquired corrective angle.

3. A seam welding method according to claim 2, wherein the step of acquiring one of the corrective angles comprises the step of correcting the corrective angle using one of corrective coefficients established for respective positions in welding regions of the workpiece.

4. A seam welding apparatus for seam-welding a workpiece held by a robot while delivering the workpiece between a pair of electrode rolls, comprising:
   a load detector mounted on the robot, for detecting a load imposed along a direction which is perpendicular to a pressing direction along which the electrode rolls press the workpiece at a weld point and a delivering direction along which the robot delivers the workpiece at the weld point;
   a turning mechanism for turning the electrode rolls about the pressing direction; and
   a controller for controlling the turning mechanism to operate depending on the magnitude of the load detected by the load detector.

5. A seam welding apparatus according to claim 4, wherein the controller includes a first table storing a correspondence relationship between magnitudes of the load and corrective angles for the electrode rolls.

6. A seam welding apparatus according to claim 5, wherein the controller includes a second table storing corrective coefficients established based on characteristics at respective positions in welding regions of the workpiece.

* * * * *